(12) United States Patent
Loporchio et al.

(10) Patent No.: US 8,517,208 B2
(45) Date of Patent: Aug. 27, 2013

(54) MUCK BUCKET

(76) Inventors: Vincent Loporchio, Acton, CA (US); Darrel Phillips, Acton, CA (US)

(*) Notice: Subject to any disclaimer, the term of this patent is extended or adjusted under 35 U.S.C. 154(b) by 192 days.

(21) Appl. No.: 12/836,246

(22) Filed: Jul. 14, 2010

(65) Prior Publication Data

US 2012/0012214 A1   Jan. 19, 2012

(51) Int. Cl.
   *B65D 1/42*   (2006.01)
   *B65D 90/12*   (2006.01)

(52) U.S. Cl.
   USPC .......................... 220/657; 220/601

(58) Field of Classification Search
   USPC ............ 220/657, 656, 654, 634, 636, 628, 220/675, 669, 623, 608, 622, DIG. 6, 601, 220/600; 137/800; 4/308, 310, 311, 420, 4/584, 595, 661, 695
   IPC .............................. B65D 90/12, 1/42
   See application file for complete search history.

(56) References Cited

U.S. PATENT DOCUMENTS

| | | | |
|---|---|---|---|
| 196,792 A * | 11/1877 | Folsom | 4/420 |
| 206,370 A * | 7/1878 | Turton | 4/332 |
| 235,134 A * | 12/1880 | Demarest | 4/420 |
| 254,417 A | 2/1882 | Whitney | |
| 862,953 A | 8/1907 | Westlake | |
| 894,288 A * | 7/1908 | Sanford | 220/622 |
| 1,063,754 A * | 6/1913 | Weiss | 210/534 |
| 1,169,335 A * | 1/1916 | McManamin | 137/800 |
| D49,007 S | 5/1916 | Bennett | |
| 1,218,380 A | 3/1917 | Dowie | |
| 1,366,268 A * | 1/1921 | McChesney | 126/361.1 |
| 2,087,220 A * | 7/1937 | Dunn | 137/272 |
| 2,392,208 A | 1/1946 | Wilken | |
| 2,545,686 A * | 3/1951 | Collins | 220/560.05 |
| 2,590,803 A * | 3/1952 | Unger et al. | 220/328 |
| 2,916,184 A | 12/1959 | Hartley et al. | |
| 3,138,698 A * | 6/1964 | Wells et al. | 219/441 |
| 3,270,910 A * | 9/1966 | Lusk | 220/327 |
| 3,302,825 A * | 2/1967 | Schleeweiss | 220/611 |
| 3,564,619 A * | 2/1971 | Magathan | 4/319 |
| 4,200,184 A | 4/1980 | Tripoteau | |
| 4,517,086 A * | 5/1985 | Romey et al. | 210/323.2 |
| 4,546,900 A * | 10/1985 | Lackey | 220/592.16 |
| 4,919,801 A * | 4/1990 | Hobson, Jr. | 210/104 |
| 5,033,637 A * | 7/1991 | Webb | 220/565 |
| 5,158,193 A | 10/1992 | Chen | |
| 5,172,739 A * | 12/1992 | Ristroph | 141/98 |
| 5,183,280 A * | 2/1993 | Gresch | 280/79.5 |
| 5,843,768 A * | 12/1998 | Lin et al. | 435/290.1 |
| 5,860,559 A | 1/1999 | Wang | |
| 7,073,547 B1 * | 7/2006 | Carlson | 141/364 |

* cited by examiner

*Primary Examiner* — Mickey Yu
*Assistant Examiner* — Robert J Hicks
(74) *Attorney, Agent, or Firm* — Kelly & Kelley, LLP

(57) ABSTRACT

A muck bucket for containing backflowing waste from an end of a pipe includes an enclosure having a continuous wall. The continuous wall includes an upper edge defining an upper opening and a lower edge defining a lower opening. The lower edge is configured to surround the end of the pipe and form a watertight seal with a surface surrounding the end of the pipe. There is at least one flange peripherally extending outwardly from the lower edge of the enclosure. The flange is secured to the surface surrounding the end of the pipe via a screw, a bolt, or an adhesive. The screw, bolt, or adhesive is included to maintain a water-tight seal between the lower edge and the surface.

18 Claims, 3 Drawing Sheets

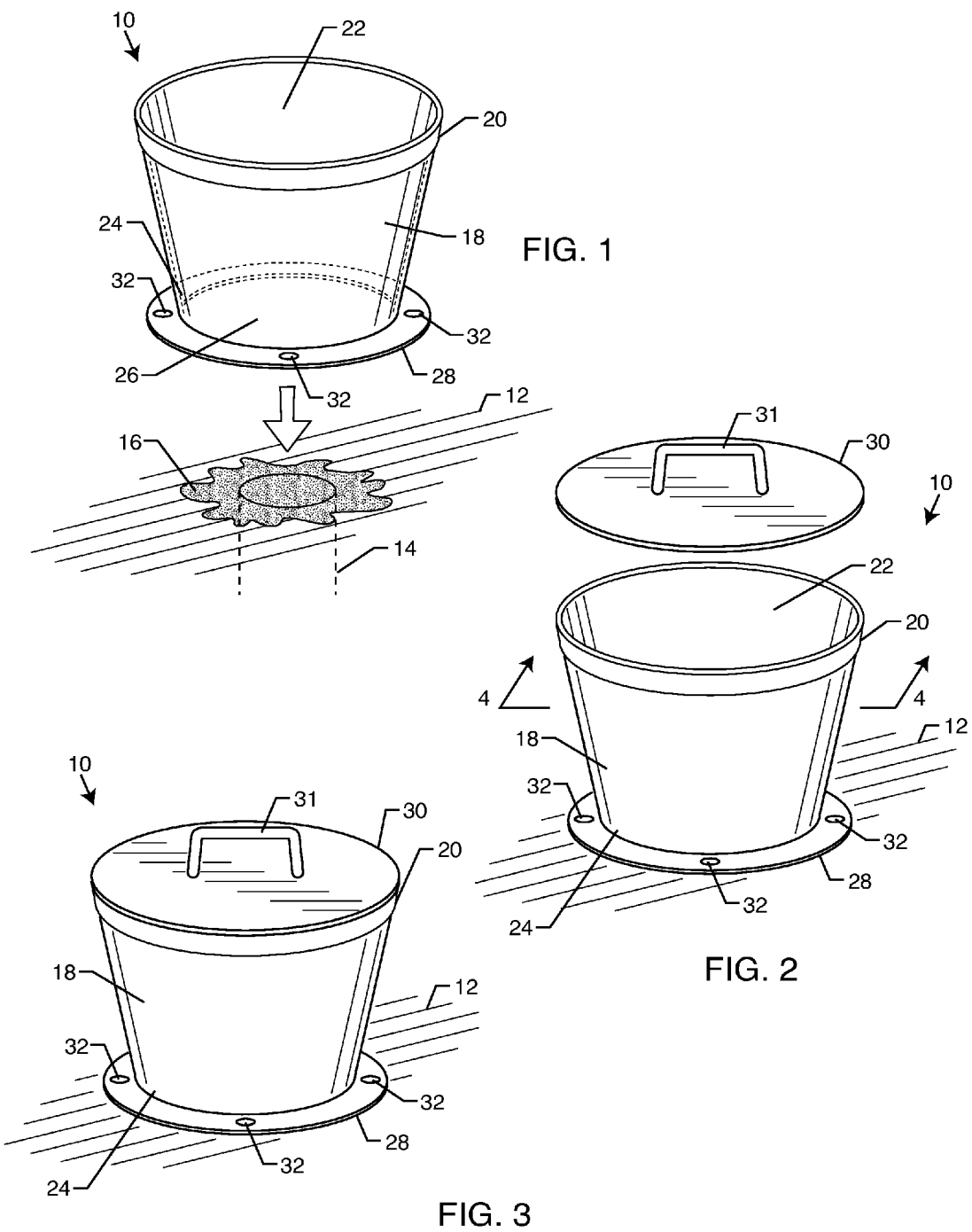

MUCK BUCKET

BACKGROUND OF THE INVENTION

The present invention generally relates to plumbing tools. More particularly, the present invention relates to an enclosure that surrounds a pipe such that servicing may be performed while retaining any backflowed waste.

The controlled flow of water and waste through civilized societies has been practiced for centuries. Standardized earthen plumbing pipes with broad flanges making use of asphalt for preventing leakages appeared in the urban settlements of the Indus Valley Civilization by 2700 B.C. Plumbing originated during the ancient civilizations such as the Greek, Roman, Persian, Indian, and Chinese civilizations as they developed public baths and needed to provide potable water, and drainage of wastes. Improvement in plumbing systems was very slow, with virtually no progress made from the time of the Roman system of aqueducts and lead pipes until the 19th century. Eventually the development of separate, underground water and sewage systems eliminated open sewage ditches and cesspools.

Plumbing is the skilled trade of working with pipes, tubing and plumbing fixtures for drinking water systems and the drainage of waste. A plumber is someone who installs or repairs piping systems, plumbing fixtures and equipment such as water heaters. The plumbing industry has been and is a basic and substantial part of every developed economy due to the need for clean water, and proper collection and transport of wastes. Plumbing also refers to a system of pipes and fixtures installed in a building for the distribution of potable water and the removal of waterborne wastes. Plumbing is usually distinguished from water and sewage systems, in that a plumbing system serves one building, while water and sewage systems serve a group of buildings or a city.

Water systems of ancient times relied on gravity for the supply of water, using pipes or channels usually made of clay, lead, bamboo or stone. Present-day water-supply systems use a network of high-pressure pumps, and pipes are now made of copper, brass, plastic, or other nontoxic material. Present-day drain and vent lines are made of plastic, steel, cast-iron, and lead. Lead is not used in modern water-supply piping due to its toxicity. Plumbing equipment now includes, for example, water meters, pumps, expansion tanks, backflow preventers, filters, water softeners, water heaters, heat exchangers, gauges, and control systems. While technology of plumbing materials and equipment has improved, so has the sophistication of a plumber's tools. Now there is equipment that is technologically advanced and helps plumbers fix problems without the usual hassles. For example, plumbers use video cameras for inspections of hidden leaks or problems, and they use hydro jets and high pressure hydraulic pumps connected to steel cables for trench-less sewer line replacement. With all the technology and sophistication, an age old problem still exists; preventing muck from backflowing out of a pipe during servicing.

It is a common occurrence for a plumber to have the need to service a blocked-off pipe. For instance, an empty stub-out may exist where a new toilet or urinal is to be installed. The stub-out is a pipe that has already been connected to an existing sewer line. The stub-out may have a temporary plug to keep unpleasant odors and any waste that may be backflowing from exiting. The plumber will have to remove the plug to install the new appliance. Unfortunately, many times waste, or herein referred to as muck, can backflow out of the pipe and spill onto the surface of the floor. Once on the floor, the muck can create severe damage and is quite unpleasant. Once the appliance is installed, significant amount of time and labor must be spent removing the muck and properly cleaning the contaminated area.

Accordingly, there is a need for a way to contain any muck that may backflow from an exposed pipe while still allowing a plumber to perform his work. The present invention fulfills these needs and provides other related advantages.

SUMMARY OF THE INVENTION

The present invention of a muck bucket for containing backflowing waste from an end of a pipe includes an enclosure having a contiguous wall. The contiguous wall includes an upper edge defining an upper opening and a lower edge defining a lower opening. The lower edge is configured to surround beyond the end of the pipe and form a watertight seal with a surface surrounding the end of the pipe. There is at least one flange peripherally extending outwardly from the lower edge of the enclosure such that the flange is substantially coextensive with the surface surrounding the end of the pipe. There is a means for securing the at least one flange to the surface surrounding the end of the pipe. This securing means is to maintain a watertight seal between the lower edge and the surface.

In an exemplary embodiment, the muck bucket includes a seal disposed between the lower edge of the enclosure and the surface. In another exemplary embodiment, the at least one flange comprises a recess in which the seal is disposed. The seal can comprise a wax, gasket, caulk, or any other suitable sealing product. Additionally, an adhesive can attach the seal to the lower edge of the enclosure or attach the seal to the surface surrounding the end of the pipe.

In another exemplary embodiment, the at least one flange comprises a single contiguous flange surrounding the lower opening of the enclosure. Alternatively, the at least one flange comprises a plurality of flanges. Also, the flange can include at least one aperture to facilitate securing the flange to the surface surrounding the end of the pipe. The securing means can comprise a screw, bolt, or any suitable fastener which extends through the at least one aperture and attaches to the surface. Alternatively, the securing means can comprise an adhesive.

In another exemplary embodiment, the muck bucket includes an inwardly extending flange dispose within the lower edge of the enclosure. The inwardly extending flange is substantial coextensive with the surface surrounding the end of the pipe. Also, a lid can be removably attached to the upper opening of the enclosure. Additionally, the enclosure can be substantially cylindrically, frustoconically, or rectangularly shaped. In an exemplary embodiment the contiguous wall is at least 18 inches in height and/or the lower opening is at least 18 inches in diameter.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of an exemplary muck bucket embodying the present invention;

FIG. 2 is a view similar to FIG. 1 now showing it surrounding an end of a pipe;

FIG. 3 is a view similar to FIG. 2 now showing a lid attached;

DETAILED DESCRIPTION OF THE PREFERRED EMBODIMENTS

Figure 4:
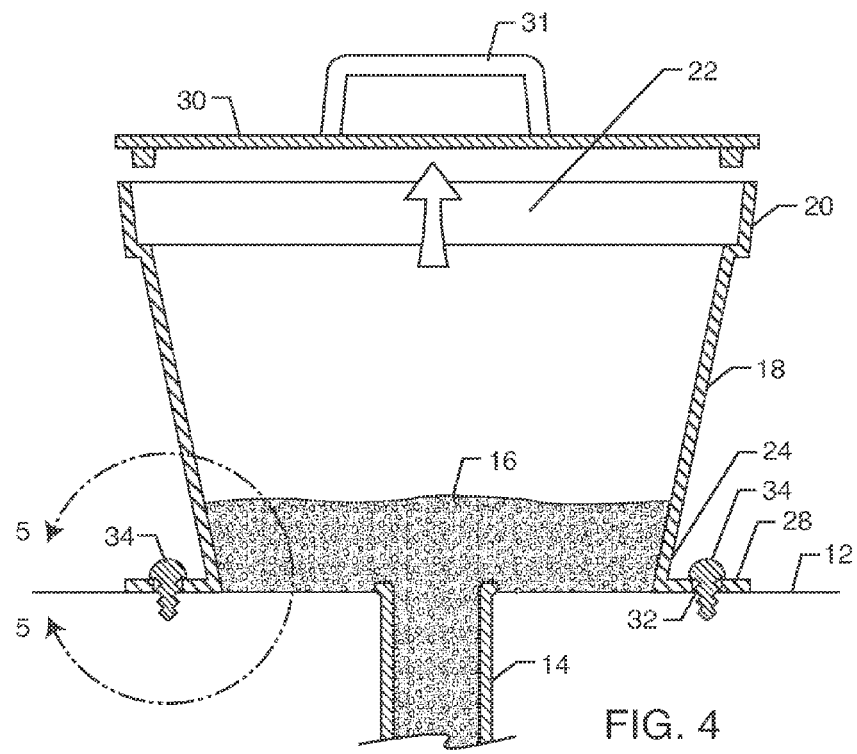
FIG. 4 is a sectional side view of the structure of FIG. 2 taken along line 4-4.

As shown in the drawings for purposes of illustration, the present invention for a muck bucket is referred to generally by the reference number 10. In FIG. 1, the muck bucket 10 is shown overtop a surface 12. The pipe 14 is substantially adjacent to the surface 12, but is not integral to the surface 12. As shown here, the pipe 14 at the surface 12 is opened such that backflowing waste 16 can spill onto the surface 12.

The muck bucket 10 includes an enclosure 18 having a continuous wall with an upper edge 20 defining an upper opening 22 and a lower edge 24 defining a lower opening 26. The lower edge 24 and lower opening 26 are configured to surround the end of the pipe 14 and form a watertight seal with the surface 12. The muck bucket 10 is then capable of locally containing the waste 16 as it continues to backflow. This prevents the waste 16 from spilling further onto the surface 12 and creating more damage and cleanup.

At least one flange 28 is peripherally attached to the lower edge 24 and extends outwardly. As shown here, the flange 28 is uniform in shape and size in that it is a contiguous circular flange. However, it is to be understood that the flange can be a multitude of designs and shapes, and this disclosure is not intended to limit it to the precise form shown and described herein. For instance, the flange 28 can be made from a plurality of flanges that peripherally extend outwardly from the lower edge 24.

FIG. 2 is a view similar to FIG. 1 where now the muck bucket 10 is on top of the surface 12. The muck bucket 10 can now allow the waste 16 to backflow and properly contain it from further spilling. A lid 30 can be used to cover the muck bucket 10. FIG. 3 is a view similar to FIG. 2 now showing the lid 30 attached. The lid 30 allows a worker to temporarily cover the waste 16 when the muck bucket 10 is not in use. The various forms of waste 16 that may be contained are likely to smell and look unappealing. The lid 30 helps contain the smell while also hiding the waste from sight. The lid 30 is depicted with a handle 31. It is also to be understood that the muck bucket 10 could also contain handles for ease of transportation.

FIG. 4 is a sectional side view of the structure of FIG. 2 taken along line 4-4. The waste 16 has backflowed and partially filled the muck bucket 10. The flange 28 maintains a watertight seal between the lower edge 24 and the surface 12. Disposed about the flange 28 is at least one aperture 32. The aperture 32 is used to facilitate securing the flange 28 to the surface 12. A screw 34, bolt, or other suitable fastener can extend through the aperture 32 and secure it to the surface 12. Whether a screw 34 is utilized depends on the material of the surface 12 and the various stages of construction a surface 12 might be in. For instance, using a screw 34 in a finished tile surface 12 is not recommended. Whereas, using a screw 34 in a wood surface 12 during building construction before tile or carpet has been laid can be recommended. It is also apparent that a plurality of apertures 32 and screws 34 may be used.

The enclosure 18 as shown is frustoconically shaped. This means that the lower opening 24 is smaller in diameter than the upper opening 22. The frustoconical shape helps maintain the watertight seal due to a slight increase of pressure exerted from the weight of the waste 16. As the waste 16 fills the muck bucket 10, a portion of the weight of the waste 16 interacts with the angled contiguous wall of the enclosure 18 forcing it downward. This increase in pressure helps to maintain the watertight seal. The muck bucket 10 can also take on other shapes, such as a rectangular shape, a cylindrical shape, or other various combinations. It is to be noted that a cylindrically shaped enclosure 18 would not create any extra downforce. Also, a reverse frustoconically shaped muck bucket 10 where the upper opening 22 was smaller than the lower opening 26 would be undesirable as the muck bucket 10 would have an inherent tendency to rise due to the pressure of the waste 16 and thereby lose the watertight seal.

The overall size of the lower opening 26 and upper opening 22 can vary, depending on the size of pipe 14 that is to be surrounded. Typically, the lower opening should be at least 18 inches in diameter and the height of the enclosure 18 should be at least 18 inches. This general size of the muck bucket 10 should be suitable to surround a majority of the types of pipes 14 one is likely to encounter that may need servicing.

Figure 5A:
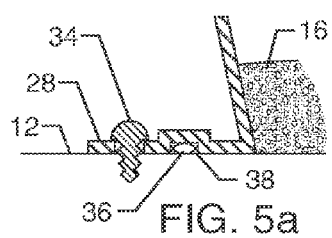
FIGS. 5a-d are enlarged sectional views of exemplary embodiments of the structure of FIG. 4 taken along line 5-5.
Figure 5B:
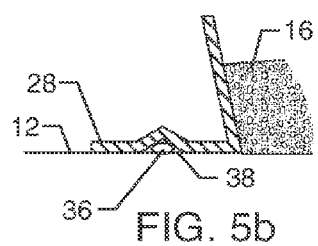
Figure 5C:
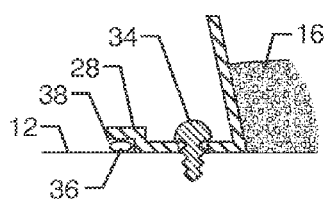

FIGS. 5a-d are enlarged sectional views of exemplary embodiments of the structure of FIG. 4 taken along line 5-5. FIG. 5a shows a seal 36 disposed with a recess 38 of the flange 28. The seal 36 can be a wax, gasket, or caulk that forms a watertight seal between the surface 12 and the flange 28. The seal 36 is needed to account for the differences between the bottom side of the flange 28 and the top of the surface 12. The seal 36 adjusts and accounts for the surface variances and thereby creates a watertight seal. The recess 38 can take many forms. For instance, FIG. 5b is another exemplary embodiment of a recess 38. FIG. 5c is yet another embodiment of a design of a recess 38. It is to be understood that many combinations of designs may be used to create a watertight seal. For instance, a recess 38 might not be used at all and the seal 36 simply placed upon the bottom of a flat flange 28. Furthermore, screws 34 may or may not be utilized.

Figure 5D:
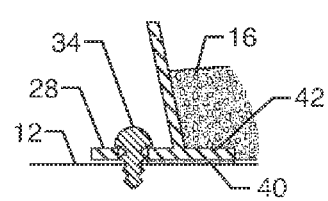

FIG. 5d shows yet another embodiment of a means for maintaining a watertight seal. An adhesive seal 40 can be attached between the flange 28 and the surface 12. The adhesive may be single-backed, or double-backed such that it helps secure it in place between the flange 28 and the surface 12. Also shown in FIG. 5d is an inwardly extending flange 42. The inwardly extending flange 42 helps to maintain a watertight seal by increasing the weight of the muck bucket 10 as waste 16 fills within. As earlier discussed, the weight of the waste 16 above the inwardly extending flange 42 helps to force the muck bucket 10 down to maintain the integrity of the watertight seal. It is also to be understood that the seal 36 and recess 38 can be disposed within the inwardly extending flange 42. Also, in another embodiment, the muck bucket 10 may only have an inwardly extending flange 42 and not have the outwardly extending flange 28.

The muck bucket 10 can be made in a variety of methods. The muck bucket 10 may be made from metal formed and welded together. The muck bucket 10 could also be made by stamping a sheet of metal into the proper shape. The muck bucket 10 may also be made of plastic. For instance, it may be blow molded into shape or injection molded. The muck bucket 10 should be made from a material that is not easily corroded from the various forms of waste 16 it may contain.

The muck bucket 10 may also be used to contain a variety of pipes and openings. For instance, it can be used to surround a sewer pipe, a grease pipe, a drain cleanout, a floor drain, a septic tank cover, a manhole cover, a water pipe, a toilet pipe fitting, and any other suitable fitting that can backflow waste. All that is needed is to apply the seal 36 to the bottom of the flange 28. Then the much bucket 10 is placed overtop the pipe 14 and pressed firmly down. This helps to force the seal 36 into contact with the surface 12. The muck bucket 10 can also be secured to the surface 12 with a screw 34 or a fastener to prevent its movement. Then the pipe 14 may be opened without the worry of waste 16 backflowing and creating severe damage. The pipe 14 may need a plunger, a plumbing-snake, or a water jetter used to clear a clog further within. Once the pipe 14 has been serviced. The inside of the muck bucket 10 can be washed downed and cleaned and a cover for the pipe 14 installed. Then the muck bucket 10 can be lifted from the surface 12 and the remaining residual seal 36 removed.

Figure 6:
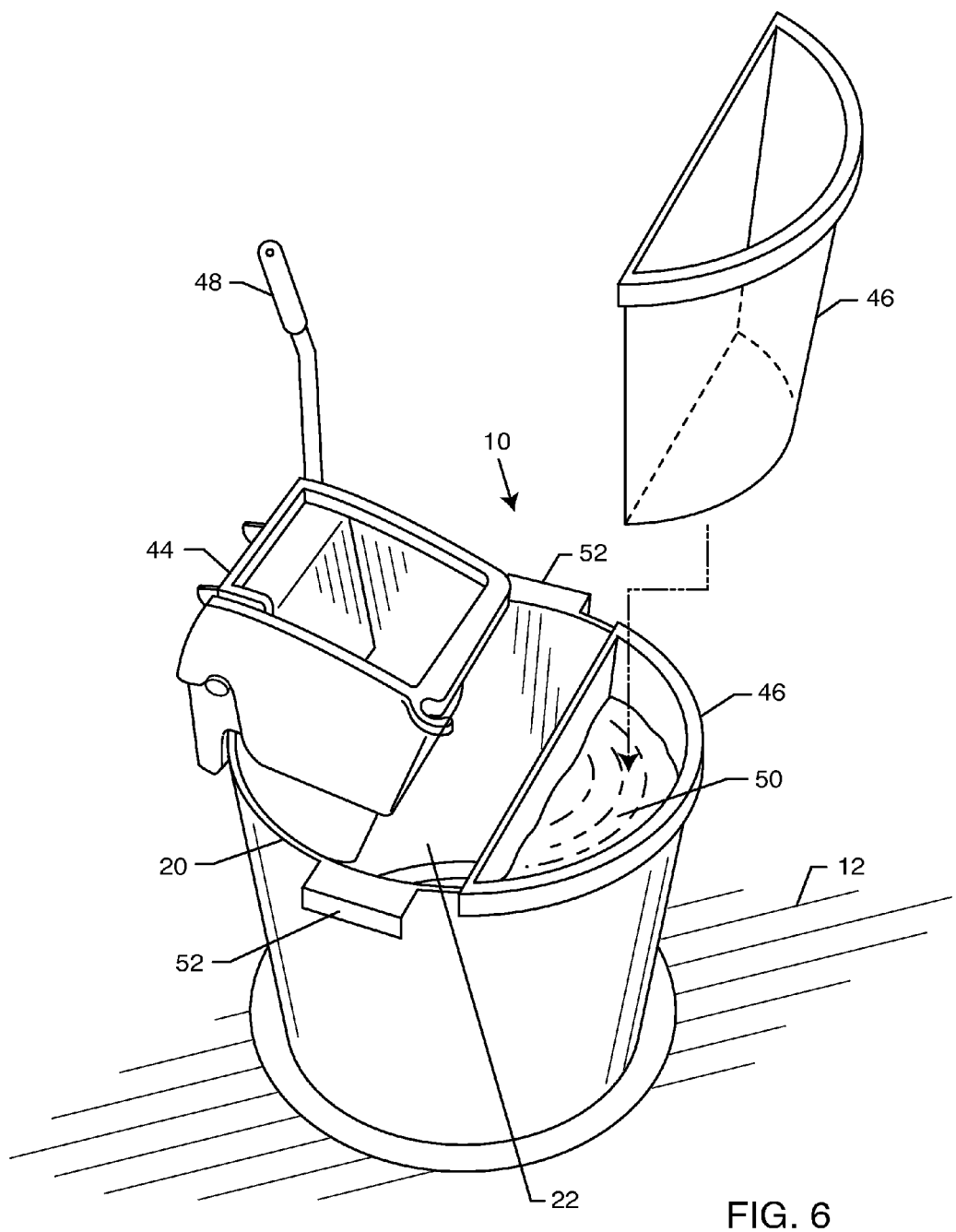
FIG. 6 is a perspective view of another embodiment of an exemplary muck bucket embodying the present invention now with a mop rinse and water sleeve.

FIG. 6 is a perspective view of another embodiment of an exemplary muck bucket 10 now with a mop rinse 44 and water sleeve 46. Here, the muck bucket 12 has a mop rinse 44 placed on the inside of the upper edge 20 of the upper opening 22. The muck bucket 10 should be placed overtop a drain, such that a mop may be squeezed through the mop rinse 44 via the mop rinse handle 48 and the dirty water can immediately drain down the enclosed drain. Furthermore, a water sleeve 46 containing clean water 50 can be fashioned to also fit within the muck bucket 10 on the inside of the upper edge 20 of the upper opening 22. Also, handles 52 may be attached to the muck bucket 10 to facilitate easy transportation.

In other embodiments, it is possible to secure the muck bucket 10 on surfaces that are not horizontal. For instance, the muck bucket 10 may be used to surround a pipe on a slanted surface, a wall, or even a ceiling if the proper seal 36 and fastening means is utilized. For instance, the muck bucket 10 could surround a fire sprinkler for testing purposes such that water spray is channeled into a bucket directly there below.

Although several embodiments have been described in detail for purposes of illustration, various modifications may be made to each without departing from the scope and spirit of the invention. Accordingly, the invention is not to be limited, except as by the appended claims.

What is claimed is:

1. A muck bucket system for containing backflowing waste from an end of a pipe, comprising:
    a pipe with at least one end;
    a surface surrounding the end of the pipe, the pipe not integral to the surface surrounding the end of the pipe;
    an enclosure including a continuous wall having an upper edge defining an upper opening and a lower edge defining a lower opening, the lower edge being configured to surround beyond the end of the pipe and form a watertight seal with the surface surrounding the end of the pipe, and the upper opening being as large or larger than the lower opening;
    at least one flange peripherally extending outwardly from the lower edge of the enclosure, the at least one flange substantially coextensive with the surface surrounding the end of the pipe; and
    a means for securing the at least one flange to the surface surrounding the end of the pipe to maintain a watertight seal between the lower edge and the surface.

2. The muck bucket system of claim 1, including a seal disposed between the lower edge of the enclosure and the surface surrounding the end of the pipe, wherein the seal comprises a wax, gasket, or caulk.

3. The muck bucket system of claim 2, wherein the at least one flange comprises a recess in which the seal is disposed.

4. The muck bucket system of claim 3, including an adhesive for attaching the seal to the lower edge of the enclosure.

5. The muck bucket system claim 2, including an adhesive for attaching the seal to the surface surrounding the end of the pipe.

6. The muck bucket system of claim 1, wherein the at least one flange comprises a single contiguous flange surrounding the lower opening of the enclosure.

7. The muck bucket system of claim 1, wherein the at least one flange comprises a plurality of non-contiguous flanges.

8. The muck bucket system of claim 6 or 7, wherein the flange includes at least one aperture to facilitate securing the flange to the surface surrounding the end of the pipe, and wherein the securing means comprises a screw or bolt which extends through the at least one aperture.

9. The muck bucket system of claim 6 or 7, wherein the securing means comprises semi-permanent adhesive.

10. The muck bucket system of claim 1, further comprising an inwardly extending flange disposed within the lower edge of the enclosure, the inwardly extending flange substantially coextensive with the surface surrounding the end of the pipe.

11. The muck bucket system of claim 1, further including a lid removably attached to the upper opening of the enclosure.

12. The muck bucket system of claim 1, wherein the enclosure is substantially cylindrically, frustoconically, or rectangularly shaped.

13. The muck bucket system of claim 12, wherein the continuous wall is at least 18 inches in height.

14. The muck bucket system of claim 12, wherein the lower opening is at least 18 inches in diameter.

15. A muck bucket system for containing backflowing waste from an end of a pipe, comprising:
    a pipe with at least one end;
    a surface surrounding the end of the pipe, the pipe not integral to the surface surrounding the end of the pipe;
    a frustoconically shaped enclosure including a continuous wall having an upper edge defining an upper opening and a lower edge defining a lower opening, the lower edge being configured to surround beyond the end of the pipe and form a watertight seal with the surface surrounding the end of the pipe, and the upper opening being as large or larger than the lower opening;
    a seal disposed between the lower edge of the enclosure and the surface;
    at least one flange peripherally extending outwardly from the lower edge of the enclosure and substantially coextensive with the surface surrounding the end of the pipe, wherein the at least one flange comprises a recess in which the seal is disposed; and
    a means for securing the at least one flange to the surface surrounding the end of the pipe to maintain a watertight seal between the lower edge and the surface.

16. The muck bucket system of claim 15, wherein the seal comprises a wax, gasket, caulk, or adhesive.

17. The muck bucket system of claim 16, further comprising an inwardly extending flange disposed within the lower edge of the enclosure, the inwardly extending flange substantially coextensive with the surface surrounding the end of the pipe.

18. The muck bucket system of claim 17, wherein the outwardly extending flange includes at least one aperture to facilitate securing the flange to the surface surrounding the end of the pipe and wherein the securing means comprises a screw or bolt which extends through the at least one aperture.

* * * * *

UNITED STATES PATENT AND TRADEMARK OFFICE
CERTIFICATE OF CORRECTION

PATENT NO. : 8,517,208 B2
APPLICATION NO. : 12/836246
DATED : August 27, 2013
INVENTOR(S) : Vincent Loporchio et al.

Page 1 of 1

It is certified that error appears in the above-identified patent and that said Letters Patent is hereby corrected as shown below:

In the Claims

In column 6, line 3 (claim 5), after "system" insert -- of --.

Signed and Sealed this
Fifth Day of November, 2013

Teresa Stanek Rea
*Deputy Director of the United States Patent and Trademark Office*